Figure 5:
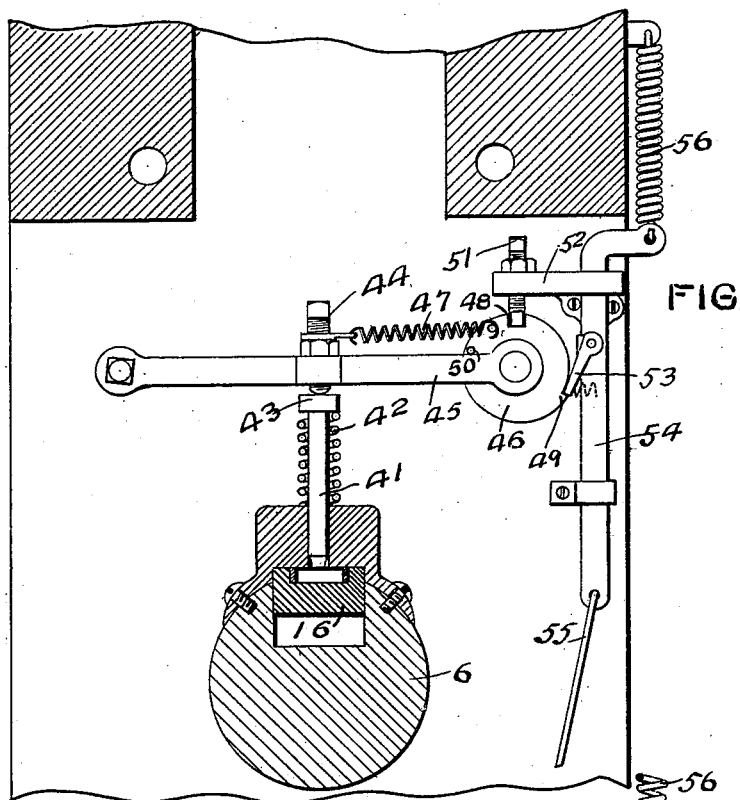

No. 666,783.  
G. W. WEBER.  
RIVETING PRESS.  
(Application filed July 10, 1899.)  
Patented Jan. 29, 1901.
(No Model.) 6 Sheets—Sheet 1.
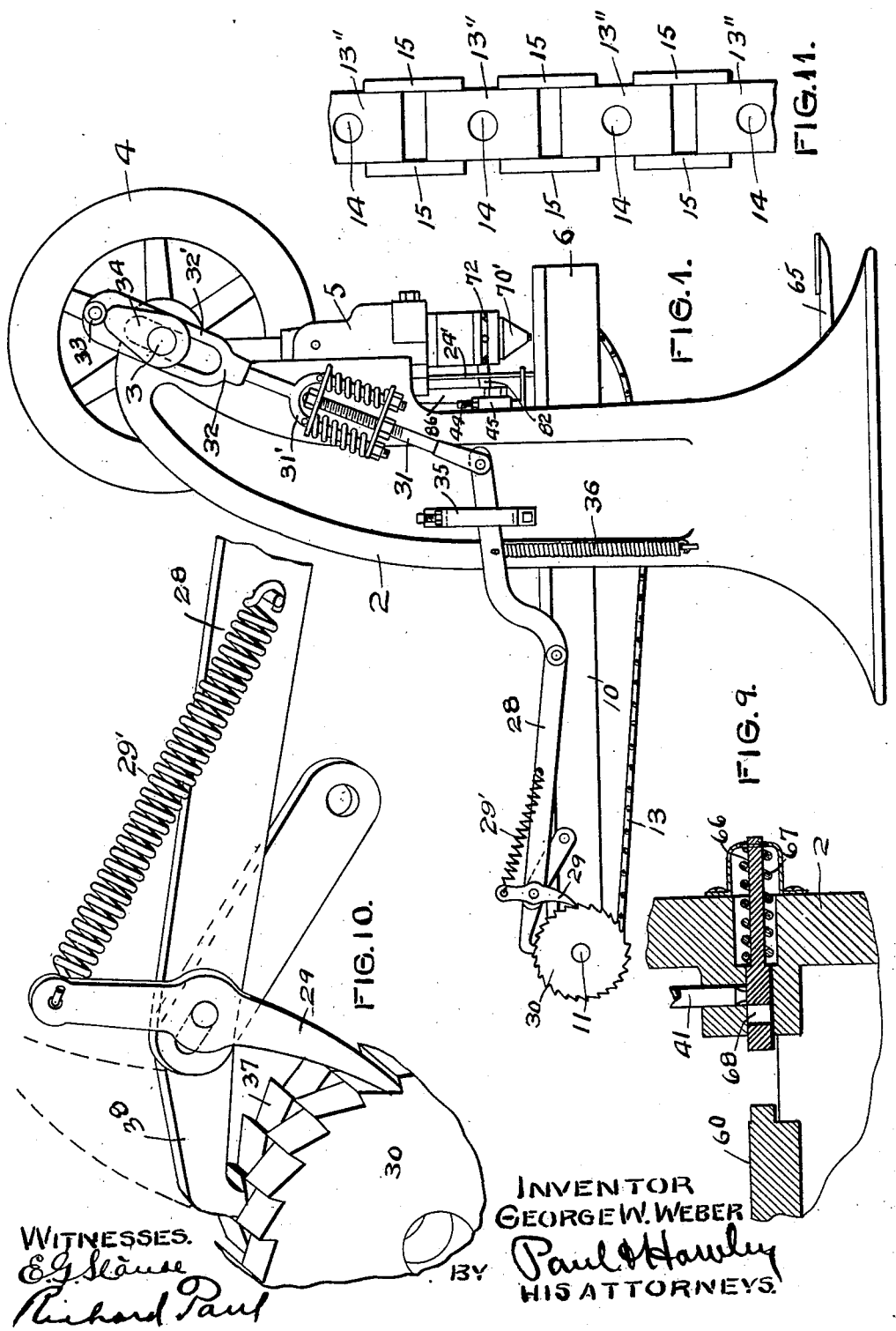
INVENTOR  
GEORGE W. WEBER  
BY Paul & Hawley  
HIS ATTORNEYS.
WITNESSES.

No. 666,783. Patented Jan. 29, 1901.
G. W. WEBER.
RIVETING PRESS.
(Application filed July 10, 1899.)
(No Model.) 6 Sheets—Sheet 2.
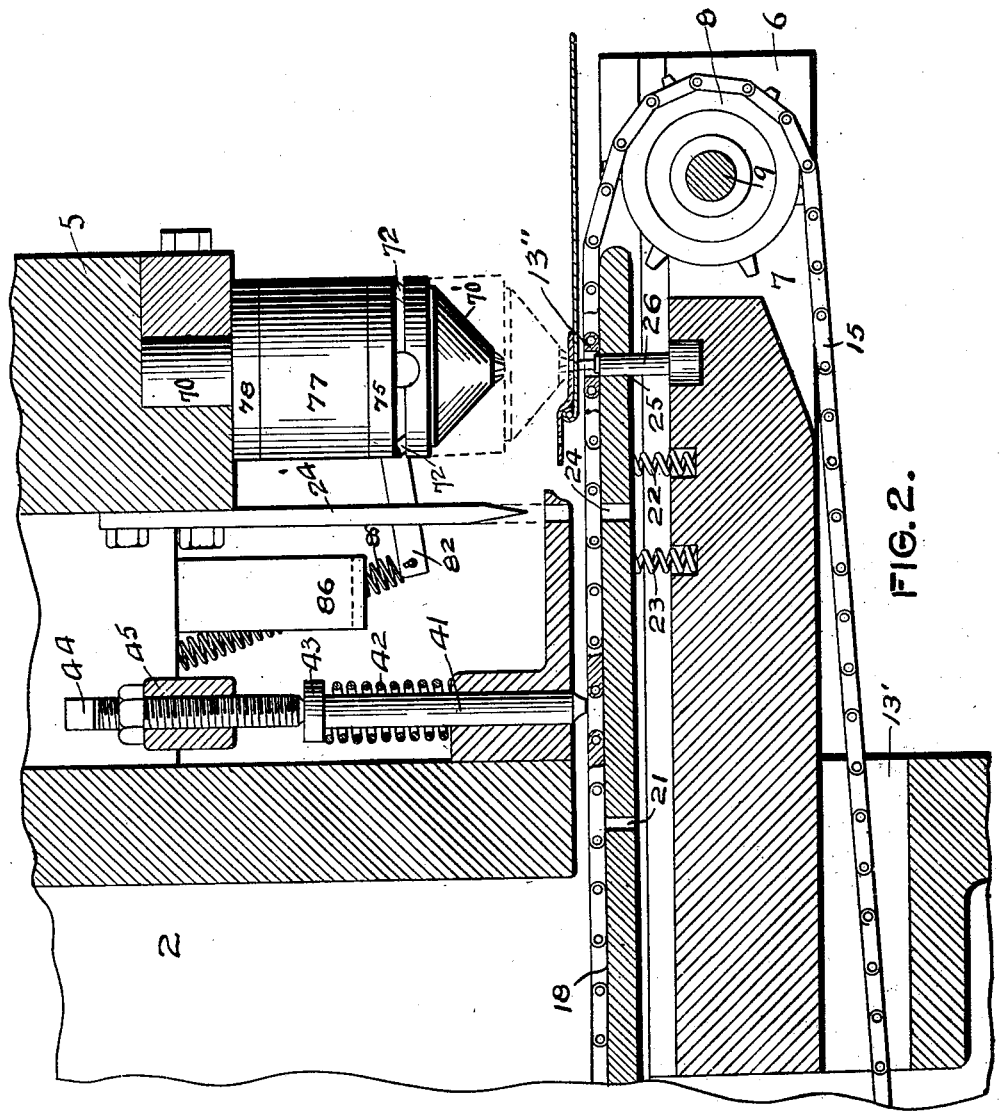
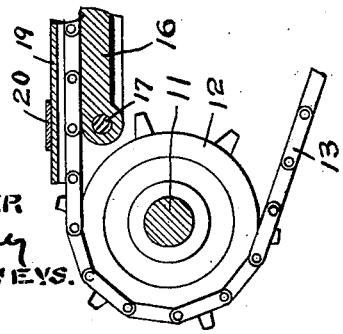
WITNESSES:
INVENTOR
GEORGE W. WEBER
BY Paul H Hawley
HIS ATTORNEYS.
THE NORRIS PETERS CO., PHOTO-LITHO., WASHINGTON, D. C.

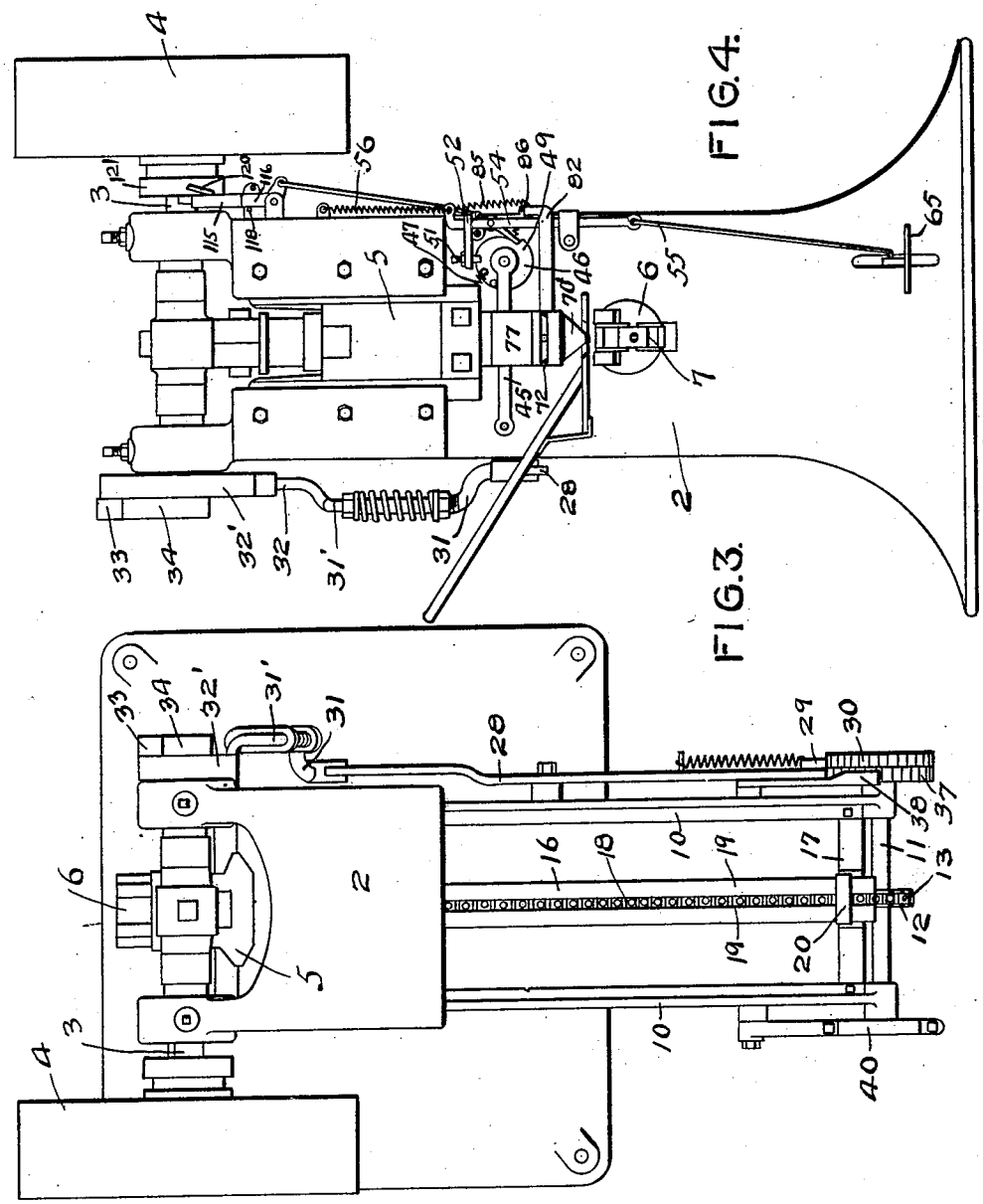

No. 666,783. Patented Jan. 29, 1901.
G. W. WEBER.
RIVETING PRESS.
(Application filed July 10, 1899.)

(No Model.) 6 Sheets—Sheet 4.

WITNESSES
E. G. Slaude
Richard Paul

INVENTOR.
GEORGE W. WEBER
BY Paul A. Hawley
HIS ATTORNEYS.

No. 666,783. Patented Jan. 29, 1901.
G. W. WEBER.
RIVETING PRESS.
(Application filed July 10, 1899.)
(No Model.) 6 Sheets—Sheet 5.

WITNESSES
E. G. Staude
Richard Paul

INVENTOR
GEORGE W. WEBER
BY Paul Hawley
HIS ATTORNEYS

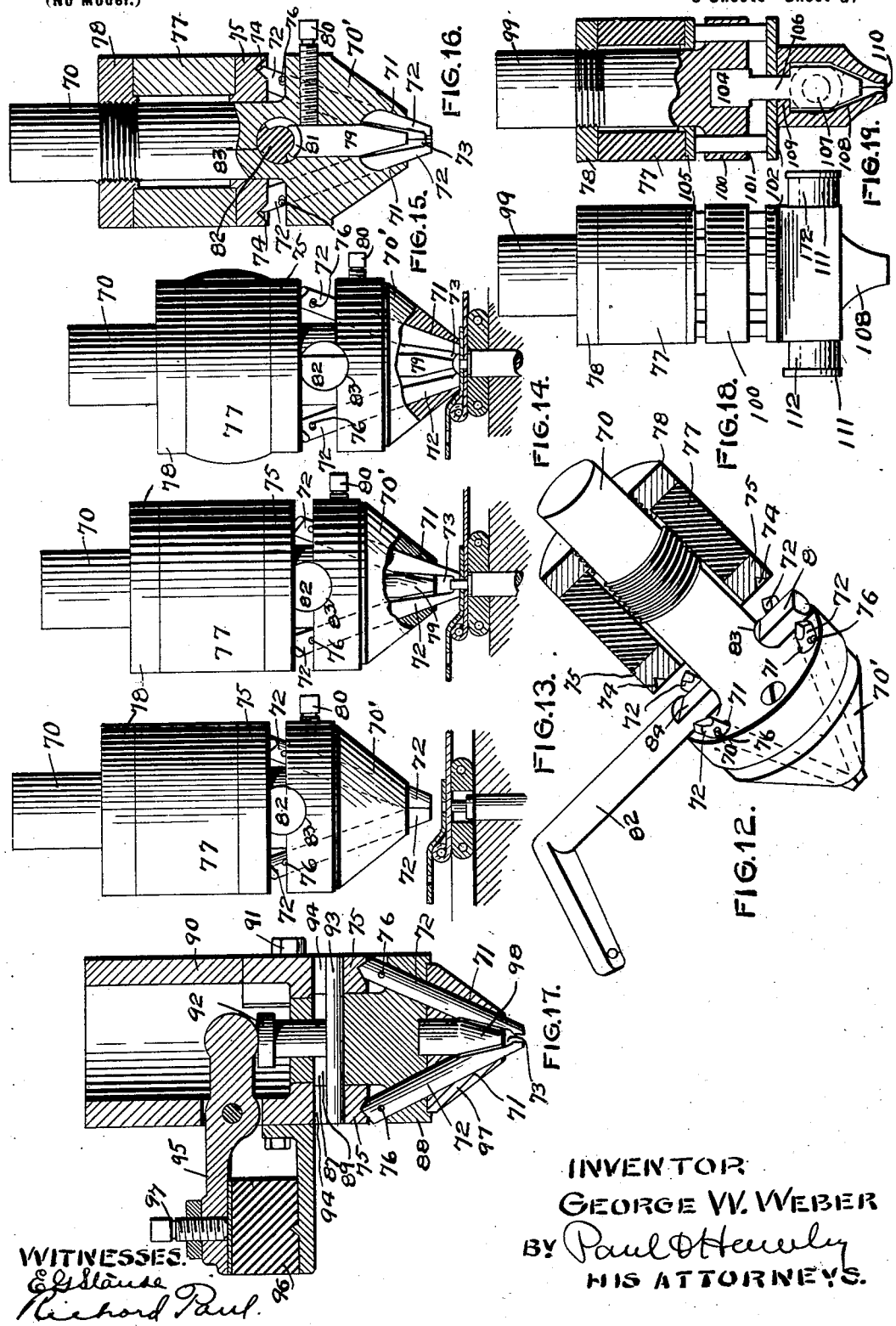

UNITED STATES PATENT OFFICE.

GEORGE W. WEBER, OF ST. PAUL, MINNESOTA.

RIVETING-PRESS.

SPECIFICATION forming part of Letters Patent No. 666,783, dated January 29, 1901.

Application filed July 10, 1899. Serial No. 723,313. (No model.)

*To all whom it may concern:*

Be it known that I, GEORGE W. WEBER, of St. Paul, Ramsey county, Minnesota, have invented certain new and useful Improvements in Presses, of which the following is a specification.

My invention relates to foot and power presses, and particularly to that class used for riveting ears upon pails and other sheet-metal articles; and the objects of the invention are, first, to provide improved means for automatically feeding rivets into a press, whereby the capacity of the riveting mechanism is increased and the operation of the press rendered more regular, producing in consequence more uniform and perfect work and at the same time effecting a considerable saving in time and labor; second, to provide improved means for securely clamping together the parts to be riveted to prevent the shank of the rivet from being upset or enlarged between the ear and the pail or other pieces of metal that are being riveted together, whereby when a head is formed on said shank by the hammer mechanism the riveted parts will be held firmly together, and, third, to provide positive means operating in connection particularly with the feeding and riveting mechanism of a riveting-press, but applicable to all forms of presses, for controlling the stroke or operation of the press, whereby accidents to the operator, breakage of the mechanism, and damage and consequent waste of the material upon which the machine is working are prevented.

The invention consists generally in a press provided with riveting attachments and means for feeding rivets thereto in position to be engaged by the hammer of the press and headed.

Further, the invention consists in means for automatically and simultaneously feeding to the riveting mechanism as many rivets as it is desired to put into the ear or other article that is being riveted.

Further, the invention consists in means for holding the feed mechanism in its proper position during the operation of riveting.

Further, the invention consists in means preventing the press, and consequently the riveting mechanism, from being operated until the rivet-feeding device and the rivet are in their proper positions.

Further, the invention consists in means acting as a die to engage the ear or other material above the rivet and causing the shank of the same to cut or force its way through the wall of the vessel or other article and through the ear that is being secured thereto.

Further, the invention consists in means for automatically forming a head on the shank of the rivet after it has been forced through the material to be riveted, while the parts are firmly held together with a yielding pressure.

Further, the invention consists in means for disengaging or releasing the die or clamping mechanism from the newly-formed head of the rivet and relieving the pressure upon the riveted parts just at the moment when the plunger begins its upward stroke.

Figure 6:
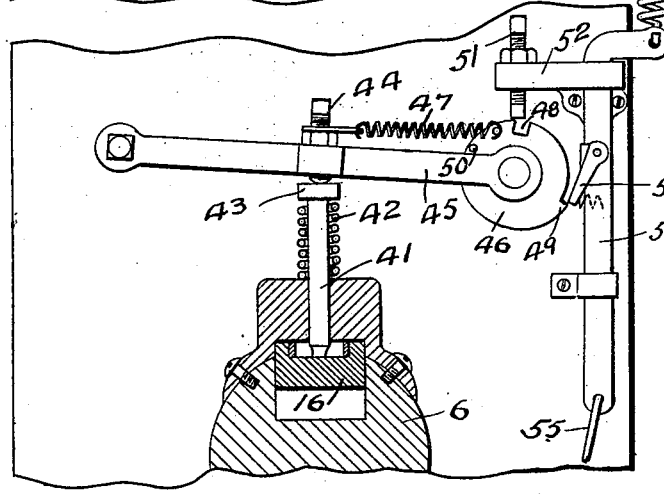
Figure 7:
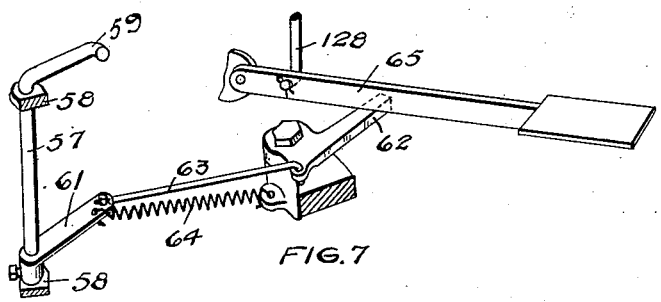
Figure 8:
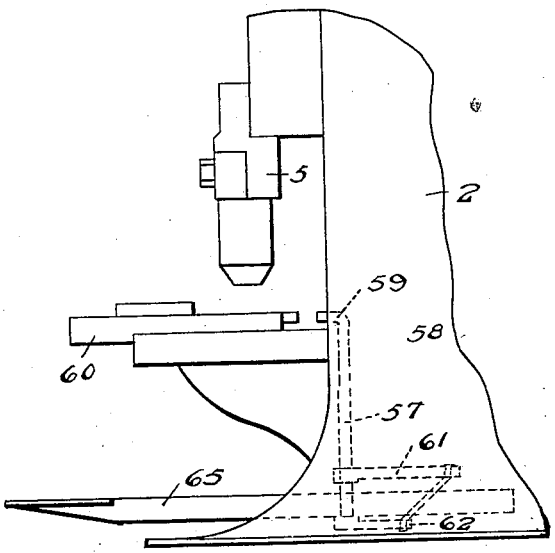

In the accompanying drawings, forming part of this specification, Figure 1 is a side elevation of the riveting-press embodying my invention. Fig. 2 is a vertical section of the same. Fig. 3 is a plan view. Fig. 4 is a front elevation. Figs. 5 and 6 are details of the mechanism for locking the press against operation when the feed device is not in its proper position. Fig. 7 is a modification of the safety device adapted particularly for presses having a sliding feed. Fig. 8 is a side elevation of the lower portion of a slide-feed press, showing the safety device in dotted lines attached thereto. Fig. 9 is a detail showing the manner of attaching the device shown in Figs. 5 and 6 to a slide-feed press. Fig. 10 is a detail of the double-ratchet device for operating the chain feed. Fig. 11 is a plan view of a section of the chain feed, showing the holes wherein the rivets are placed. Fig. 12 is a perspective of the head or ram, its upper part being in section and wherein the riveting devices are supported. Fig. 13 is a side elevation showing the jaws of the head about to engage the material to be riveted. Fig. 14 is a similar view with the lower portion of the head broken away, showing the jaws in engagement with the metal after having forced the rivets through the same. Fig. 15 is a similar view showing the riveting-hammer in the act of heading a rivet. Fig. 16 is a vertical section showing the means for supporting and operating the riveting-hammer. Fig. 17 is a vertical section of a modified construction of head. Fig. 18 is an elevation of still another form of head. Fig. 19 is a vertical section of the same.

In the drawings, 2 represents a power-press of the usual style, having a shaft 3, pulley 4, driven from a suitable source of power, and a plunger 5, eccentrically mounted upon said shaft and reciprocated by the revolution of the same. Beneath the plunger 5 and horizontally supported in the frame or base of the press is a horn 6, extending out into the path of the plunger at the front of the machine and upon which the rivets and the articles to be riveted are usually placed or supported, all of which is common to presses of this kind. It is desirable, however, in order that time and labor may be saved in the operation of the press to provide means for automatically feeding rivets therein one or more at a time, according to the number that it is desired to place in the ear or other article that is being riveted, and placing said rivet in position on a suitable support as a preliminary step to the riveting operation. I therefore prefer to provide said horn, preferably near its outer end, with a socket 7, wherein the sprocket-wheel 8 is mounted on a horizontal shaft 9, and at the rear of the machine is a rectangular frame in substantially the same horizontal plane as said horn 6, comprising parallel bars 10 10, having their inner ends secured to the frame of the press, and at their outer ends a shaft 11, wherein is mounted a sprocket-wheel 12, over which the chain 13 passes to the sprocket 8 and through an opening 13' in the press-frame beneath the horn. This chain, as shown in Fig. 11, consists of a series of blocks 13'', having cylindrical openings 14, preferably near the center of the blocks, which are connected by side bars 15 15, spaces being provided between the ends of the blocks to receive the teeth of the sprockets. The holes 14 are made of the proper size to receive rivets dropped therein automatically or by an attendant, as preferred, and to carry them into the press to the riveting mechanism, and there may be as many holes in the chain to receive as many rivets as the operator may desire to rivet at one stroke or operation of the press. In order that the upper section or leg of the chain may be maintained in a substantially horizontal position and the rivet prevented from dropping out through the holes in the chain, I prefer to provide a chain guide or casing comprising a horizontal bar 16, (see Figs. 2 and 3,) pivoted, preferably, near its outer end on a rod 17, that is secured to the bars 10 10 in front of the sprocket 12. The bar 16 is preferably provided in its upper surface with a longitudinal groove 18, wherein the chain slides, and is held therein by narrow strips or plates 19 19, secured to said bar with their inner edges overhanging said groove and connected at intervals by straps 20. I also prefer to provide a hole 21 (see Fig. 2) in the bottom of the groove 18 and at one side of the center thereof, through which any rivets or foreign material that may be between or under the links of the chain will fall and not be carried into the riveting mechanism of the press. The forward end of the bar 16 extends over the horn 6 and has a vertically-reciprocating movement upon its support, and between the forward end of said bar and said horn I prefer to provide springs 22 and 23, their upper ends engaging the upper surface of said bar and their lower ends fitting within recesses in said horn. (See Fig. 2.) These springs are compressed by the downstroke of the plunger and serve to return the reciprocating bar to its normal horizontal position when the operation of the riveting is completed. I also prefer to provide holes 24 and 25 in said bar above the forward or outer end of said horn, said hole 25 receiving the upper end of the anvil 26, upon which the rivet is placed by the feed mechanism, while its lower end is preferably squared and fits within a correspondingly-shaped socket in said horn. A guide pin or rod 24', (see Fig. 2,) carried by the plunger, has a lower end to pass between the links of the chain, and entering the hole 24 holds the feed-chain in position during the operation of riveting.

The press herein shown and described, with its attachments, is especially adapted for riveting ears upon tin pails and other sheet-metal articles, and I have shown a rivet-feeding mechanism designed particularly for use where only one rivet is used to an ear to advance the rivets one by one into the machine and place them in proper position to be passed or forced through the vessel and ear and then headed. I do not, however, wish to be confined to this construction, as the number of holes in the chain may be increased to feed two or more rivets simultaneously into the machine, according to the number that it is desired to put into each ear, and when more than one rivet is fed into the machine at one movement I prefer to provide a corresponding number of anvils therefor to permit all the rivets to be forced through the metal and headed at one stroke or operation of the press.

Any suitable means may be employed for driving the rivet-feeding chain; but I prefer to provide the mechanism shown in Fig. 1 of the drawings and in which 28 is a lever pivoted to one of the arms 10 10, having at its outer end a pawl 29 to engage the teeth of a ratchet 30, mounted on said shaft 11, and its inner end normally held in a depressed position in a guide 35 by a spring 36, and said lever is pivotally connected to a rod 31, having an adjustable yielding connection with a yoke 31', provided on the lower end of a rod 32, having at its upper end a cross-head or block 32', that is slotted to receive the end of the shaft 3, and provided with a roller 33, engaged by a cam 34 on said shaft 3, and whereby said rod and said lever 28 are reciprocated by the operation of the press. I prefer to provide a suitable yielding connection (see Fig. 1) between the rod 31 and the yoke 31', so that the clogging or breaking of the feed mechanism will not stop the press. It is obvious that as the inner end of the lever 28 is operated by the operation of the machine the pawl 29 in engagement with the teeth of the ratchet 30 will cause the shaft 11 to revolve and set the chain in motion to feed the rivets into the machine; but in order that the ratchet 30 may not move too far at any time during its revolution I prefer to provide a second ratchet 37, secured to the ratchet 30 on the shaft 11 and having oppositely-cut teeth to be engaged by the pawl 38, pivoted at its inner end to one of the bars 10 and at its middle point pivotally connected to the lever 28 in a slot wherein the pawl pivot-pin is slidable to compensate for the difference in the distances from the centers of the pawl 38 and the lever 28. When the lever 28 is depressed, the pawl 38 will be raised up away from the teeth of the ratchet 37 and the pawl 29 will be moved one tooth on the ratchet 30, being held in engagement therewith by the spring 29'. When the lever is raised, the pawl 29 will advance its ratchet one tooth and the pawl 38 will engage the teeth of its ratchet and lock the ratchet 30 against further rotation. The feed device is thus moved one step and the ratchet 30 is advanced one tooth at each stroke of the machine. Upon the opposite end of the shaft 11 I prefer to provide a friction brake mechanism 40, which prevents the momentum of the moving parts from advancing the feed mechanism faster than desired.

As the feed mechanism advances the rivets into the machine and places them in position to be forced through the metal and headed, it is desirable to provide some means for preventing the descent of the plunger and the consequent damage to the feed mechanism and material upon which the machine is working unless the feed mechanism is in exactly its proper position for the riveting operation. I therefore prefer to provide, as shown in Figs. 5 and 6, a safety device in connection with the feed mechanism, which consists of a pin 41, vertically movable within a socket in the frame of the press and normally held in an elevated position by a spring 42, having a head 43 to be engaged by a set-screw 44 on a lever 45, pivoted at one end to the frame of the press and having at its opposite end a disk 46, connected, preferably, with said set-screw by a spring 47 and having a notch 48 and a shoulder 49 in its periphery. A pin 50 is provided in the side of said disk to engage the lever 45 and limit the movement of said disk toward the set-screw. A set-screw 51 on a bracket 52 engages the notch 48, and a pawl 53 on the vertically-slidable bar 54 engages the shoulder 49, and the lower end of said bar 54 is connected with the treadle of the press by a link 55 and its upper end connected to the frame of the press by a spring 56. When the bar 54 is depressed by the movement of the treadle to start the machine, the pawl 53, engaging the shoulder 49, disengages the disk from the pin 51 and depresses the free end of the lever 45 should the chain feed be in proper position to permit the pin 41 to enter one of the spaces between the links of the chain. If, however, the chain feed is not in its proper position, the operator will not be able to disengage the disk from the pin 51, and consequently be unable to depress the treadle to start the machine. This mechanism is especially designed for use in riveting-machines using the feed device above described, but may be employed with slight modifications in connection with a press where the die is supported upon a sliding frame. A clutch or stop mechanism, as shown in Fig. 4, is provided on the machine and operatively connected with the bar 54; but I make no claim on the clutch in this application, as it forms the subject-matter of a companion application filed September 15, 1899, Serial No. 730,545.

In Figs. 7 and 8 I have shown a modification of the device for preventing the descent of the plunger when the feed mechanism is not in its proper position, said device being designed particularly for use in connection with presses wherein the die is mounted on a horizontally-slidable frame instead of being carried by a vertically-reciprocating plunger. The device consists of a shaft 57, supported in vertical bearings in the frame 58 of the press and having at its upper end a horizontal arm 59 in position to be engaged by the sliding frame 60, wherein the die is supported. The lower end of the shaft 57 is provided with an arm 61, preferably adjustable, and connected at its outer end to a horizontally-movable dog 62 by a link 63. A spring 64, connecting the arm 61 with the frame of the machine, normally holds the arm 59 in the path of the sliding frame and the dog 62 in position to prevent the treadle 65 from being depressed by the operator until the sliding frame 60 has rocked the shaft 57 and pushed the dog away from beneath the treadle. In Fig. 9 I have shown the mechanism illustrated in Figs. 5 and 6 adapted for use in connection with the press shown in Fig. 8 and in which the pin 41 is shown in position to engage the horizontally-sliding bar 66, mounted in said frame and normally held in position to be engaged by the sliding frame 60 by a spring 67. Said bar is provided with a hole 68 to receive the lower end of the pin 41 when the bar has been engaged and pushed back by the sliding frame, which does not engage said bar until it has nearly reached its proper position beneath the plunger. When the die is in the proper position to start the machine, the bar 66 will be pushed back to permit the pin 41 to enter the hole 68 and allow the treadle to be depressed and the machine started.

Having now described the mechanism for feeding rivets into the machine and the devices in connection therewith for controlling the movement of the press, I will now describe my improved means for pressing or forcing the shank of the rivet through the pieces of metal that are to be secured together and then forming a head thereon.

In riveting-machines as generally used when more than one rivet is used to each ear the position of the vessel and the ear must be changed as many times as there are rivets to be inserted, and the operator usually places a rivet in the machine each time the vessel and ear are moved. This method of securing ears to sheet-metal vessels is not only slow and laborious, but should the operator place the vessel, the ear, or the rivet a fraction of an inch out of their proper positions the work is liable to be ruined by the descending punch or die, and as the ears are not held firmly in position during the process of heading the rivet it frequently happens that when the operator is securing an ear having one or more rivet-holes the rivet will be upset between the ear and the vessel and the heading of the rivet will not secure the ear firmly to the pail, but permit it to work loose and be pulled off.

One of the most essential features of my invention is to provide means for securely clamping the ear to the pail with a yielding pressure, which as the plunger descends acts as a die and causes the shank of the rivet to cut or force its way through the wall of the pail or other vessel and through the ear, in case a light one is used, or, if a heavy ear, through one of the perforations therein. The rivet having been forced through the material, I provide means for heading the same while the ear is still firmly clamped in position, so that there is no possibility of the rivet-shank being upset between the vessel and the ear. To this end I provide a mechanism consisting, preferably, of a head or ram secured to the plunger 5 and comprising a shank 70, having an enlarged and preferably tapered head 70′, provided at its lower end with a hole or opening, from which leads a series of diverging sockets 71 for the pins 72, forming movable jaws that spread outwardly in their sockets from the bottom toward the top and whose lower ends meet and project beyond the lower end of said head 70′ and bear upon the ear to be riveted. The lower ends of said jaws are also cut away on the inside, forming a socket 73 to receive the upper end of the rivet prior to the engagement therewith of the riveting hammer or punch. The upper ends of the jaws 72 project above the head 70′ (see Figs. 12 and 16) into sockets 74 in a slidable washer or ring 75 on the shank 70 and are retained in their proper position by cross-pins 76, resting on said head. Upon the shank 70, above said washer 75, is a cylindrical spring 77, preferably of rubber, held in position and put under tension by an interiorly-threaded nut 78, engaging the threaded surface of said shank. The tension of the spring 77 serves to hold the movable jaws 70 in engagement with the ear or other article to be riveted and aids them in drawing or forcing the shank of the rivet through the wall of the vessel and ear. Above the socket 73 is a vertical opening in said head, wherein a hammer 79 is adjustably supported by means of a set-screw 80, the upper end of said hammer fitting within a socket 81 in a cam-lever 82, (see Fig. 16,) supported within a transverse opening 83 in said shank, said cam-lever being provided with flat surfaces 84, which when the head is in its normal position bear upon the under surface of the ring or washer 75, as shown in Fig. 12. The compression of the spring 77 by the plunger in its downward movement forces the jaws upward and as they spread or separate permits the head of the hammer or riveting-punch to strike and form a head on the shank of the rivet, during which time the ear is firmly pressed on the side of the vessel by the pressure of the jaws. The outer end of the cam-lever 82 is connected by a light spring 85 (see Fig. 4) with the frame of the press, which causes said lever to tilt as the plunger descends and turn the flat surfaces 84 to a position at right angles to the washer 75, as shown in Fig. 15, releasing the jaws from pressure and permitting them to move upward and, separating, free themselves from the headed ends of the rivet just at the time when the plunger begins its upward movement. This feature of my invention is an important one, as it prevents the head of the rivet from being pulled off by the jaws as the plunger begins its upward movement. During the upward stroke of the plunger the lever 82, engaging the lug 86, returns to its normal position.

In Fig. 17 I have shown a modification of the head, which consists in providing a short shank 87, having a head 88 at its lower end, its upper end being secured within the lower end of the plunger or ram 90 by the clamping-screw 91 or by other suitable means and provided with a transverse hole or opening 89. The upper end of said shank is also provided with a vertical opening communicating with the opening 89, and a pin 92, arranged within a recess in the plunger, is vertically movable in said opening and has its lower end resting upon a transverse bar 93, that is vertically movable within the opening 89 and openings 94 in the wall of the plunger. A lever 95 is pivoted within a recess in the wall of the plunger and has its inner end resting upon the top of said pin 92 and its outer end held in engagement with a block 96, of rubber or other suitable material, by a set-screw 97, by means of which said block may be put under tension and takes the place of the spring 77, heretofore described with reference to Fig. 12. Below the bar 93 is the washer 75, having sockets corresponding to those heretofore described with reference to Fig. 12 to receive the upper ends of the movable jaws 72, fitting within diverging sockets in said head and in a conical block 97, fitting within a socket in said head 88 and having a vertical central opening to receive the hammer or riveting-punch 98, whose upper end engages a socket in said head 88 and whose lower end is tapered to pass down between the ends of said movable jaws to engage and head the shank of the rivet. The operation of this form of head is similar to that shown in Fig. 12, the block 96 corresponding in its functions to the yielding rubber ring 77.

In Figs. 18 and 19 I have shown a still further modification of the head or support for the riveting mechanism, in which a shank 99 is provided at its lower end with a head 100, having vertical holes or openings to receive pins 101 on a plate 102, provided with a central opening wherein the shank 100 of the riveting hammer or punch is vertically slidable. The hammer at its upper end is provided with a head 104, fitting within a socket in the head 100, and above which is a washer 105, resting upon the top of said pins 101. Upon the washer 105 I provide the spring 77, preferably of rubber, similar to that described with reference to Fig. 12, and put under tension by the interiorly-threaded nut 78, engaging the threaded surface of said shank, also as described with reference to said Fig. 12. The shank 106 of the riveting-hammer is provided at its lower end with a head 107, preferably tapered and fitting within a socket between the jaws 108, that are provided at their upper ends with inwardly-turned flanges 109, resting upon the upper end of the head 107. The lower ends of the jaws are tapered, as shown, and are cut away on the inside, forming a socket 110 to receive the shank of the rivet after it has passed through the metal to be riveted together. The jaws 108 bear upon the ear or other piece of metal with a yielding pressure, and in order that they may be moved aside to permit the hammer to head the rivet I provide lugs 111 on the outside of said jaws, over which bands of rubber 112 or other yielding material may be placed to hold said jaws together with a yielding pressure. The operation of riveting with these jaws is similar to that described with reference to Fig. 12, except that the jaws 108 spread outwardly when the tapered head 107 is forced down between them, while in Fig. 12 the jaws spread as they are moved upwardly. If two or more rivets are used to an ear, I provide a corresponding number of pairs or sets of jaws in the head.

The operation of the press with my improvements attached thereto is as follows: A rivet having been placed upon the anvil by the automatic feeding mechanism, the operator places the vessel and ear over the rivet guided by a suitable gage and then puts his foot on the treadle, and should the feed mechanism be in its proper position the treadle may be depressed sufficiently to release the clutch mechanism and start the machine, and as the plunger descends the movable jaws will bear upon the ear and draw the shank of the rivet up through the metal into the socket at the lower end of the jaws. At this moment the plunger will have descended far enough to force the jaws upward, and as their lower ends separate the hammer or riveting-punch will stike the shank and form a head thereon, while the ear is held firmly in position on the vessel by the pressure of the jaws. As soon as the head is formed on the rivet the plunger begins its upward stroke, the pressure is relieved from the jaws, and they become loose in their sockets and disengage themselves from the newly-formed head of the rivet. While the plunger is making its upward or return stroke, the operator places another ear in position on the vessel to be riveted, and by the time the clutch mechanism has been automatically operated and the machine stopped and started again by a second depression of the treadle, the rivet, ear, and vessel will be in proper position to repeat the riveting operation.

I am aware that various other means may be employed for automatically feeding rivets to the press and for forming heads on them after being placed in position, and I am also aware that in many respects the safety devices which I have shown and described may be modified, and I therefore do not confine myself to the details of construction herein shown and described.

Having thus described my invention, I claim as new and desire to secure by Letters Patent—

1. In a riveting-press, a sliding rivet-feeding mechanism, means for operating said feed mechanism, a riveting mechanism, and means controlled by the operation of said riveting mechanism for locking said feed mechanism during the riveting operation, substantially as described.

2. In a riveting-press, a rivet-feeding mechanism and means for operating the same, in combination, with a riveting device and means controlled by the operation of said riveting device for engaging and locking said feed mechanism during the riveting operation.

3. In a press, a feed device, in combination, with a reciprocating head or plunger, and means controlled by the movement of said plunger for engaging and locking said feed device during the latter part of the downstroke of said plunger, for the purpose specified.

4. In a riveting-press, the combination, with a riveting-head, of a chain-feed, a guide therefor, an anvil whereon the rivets are deposited, and means controlled by the movement of said head for locking said chain during the riveting operation, substantially as described.

5. A feed device for riveting-machines, comprising a horn, a frame in the plane thereof, a guide-bar supported by said frame in line with the axis of said horn, shafts mounted in said frame and said horn, sprockets provided on said shafts, an endless belt or chain passing over said sprockets and longitudinally over said guide-bar, means for driving said sprockets and said chain, and an anvil provided near the inner end of said guide-bar and whereon the rivets are deposited by said chain, substantially as described.

6. A feed device for riveting-machines, comprising a horn, a frame projecting at the rear of the machine, shafts mounted in said frame and said horn, sprockets provided on said shafts, an endless belt or chain passing over said sprockets having pockets or sockets to receive the rivets, means for driving said sprockets and said chain, a guide-bar supported in said frame substantially in line with the axis of said horn over which said chain moves, and an anvil supported in said horn and projecting into an opening or socket in said guide-bar, substantially as described.

7. In a riveting-press, a feed mechanism, comprising a horn, a frame forming a continuation of the same, sprocket-wheels mounted in said frame and in said horn, means for driving said wheels, a chain or belt passing over said sprockets and having sockets to receive the rivets, a guide-bar supported in said frame, substantially in line with the axis of said horn, said bar having a groove wherein said chain or belt slides, and an anvil supported by said horn near the inner end of said guide-bar and whereon the rivets are deposited by said chain, substantially as described.

8. In a riveting-press, the combination, with a reciprocating riveting mechanism, of a horn beneath the same, an anvil supported by said horn, a yielding guide-bar above said horn and having a socket to receive said anvil, a chain or belt passing over said guide and adapted to deposit rivets upon said anvil, means for driving said chain and a pin carried by the plunger of said reciprocating mechanism and adapted to engage said chain and lock the same in position during the riveting operation, substantially as described.

9. The combination, with a reciprocating riveting mechanism, of a feed device arranged beneath the same, means for operating said feed device, a yielding guide-bar over which said feed device moves, an anvil supported beneath said riveting mechanism and whereon the rivets are deposited by said feed device, and a guide-pin carried by said riveting mechanism and adapted to engage said feed device and prevent movement of the same during the riveting operation, substantially as described.

10. In a riveting-press, the combination, with a riveting mechanism, of a sliding rivet-feed device arranged beneath the same, means for operating said feed device, a yielding bar over which said feed device moves, an anvil supported beneath said riveting mechanism and having its upper end fitting within a socket in said guide-bar and whereon the rivets are deposited by said feed device, substantially as described.

11. The combination, with a reciprocating riveting mechanism, of a feed device arranged beneath the same, a guide-bar over which said feed device moves, an anvil provided in the path of said feed device and whereon the rivets are deposited, the top of said anvil being substantially flush with the top of said guide-bar, means for normally holding said guide-bar in a raised position but permitting the depression of the same upon the descent of the riveting mechanism.

12. The combination, with a riveting head or plunger, of a chain feed device arranged beneath the same, a guide-bar over which said chain moves, an anvil supported beneath said riveting-plunger and having its upper end fitting within a socket in said guide-bar and substantially flush with the top of the same, and spring devices normally holding said guide-bar in an elevated position but permitting the depression of the same upon the descent of the plunger.

13. The combination, with a riveting plunger or head, of a chain rivet-feeding device supported beneath the same, means for driving said chain, a pivoted guide-bar having a groove in which said chain moves, an anvil supported beneath said plunger and having its upper end projecting into a socket in said guide-bar, said upper end being substantially flush with the bottom of said groove to permit the feed device to deposit the rivets upon said anvil, and spring devices provided in connection with the said guide-bar for normally holding it in an elevated position but permitting it to be depressed upon the descent of the plunger, substantially as described.

14. The combination, with a riveting-plunger, of a rivet-feeding mechanism arranged beneath the same, means for operating said feeding mechanism, a stationary anvil supported beneath said plunger, a guide-bar over which said feed mechanism moves and having a socket to receive the upper end of said anvil, the top of said guide-bar being normally flush with the top of said anvil, spring devices normally holding said guidebar in an elevated position but permitting it to be depressed by the descent of said plunger, and a guide pin or rod carried by said plunger and adapted to engage the feed device and lock the same during the riveting operation, substantially as described.

15. In a riveting-press, the combination, with a riveting head or plunger, of a rivet-feeding device, a clutch within the control of the operator to be thrown into operation to start the machine, and means preventing the operation of said clutch until the rivet has been placed by said feed mechanism in a certain predetermined position, substantially as described.

16. In a riveting-press, the combination, with a reciprocating head or plunger, of a sliding feed device, a mechanism thrown into operation by the operator of the machine for starting the same, and means in connection with said mechanism to prevent its operation unless said feed device is in a certain predetermined position substantially as described.

17. In a riveting-press, the combination, with a reciprocating riveting mechanism, of a feed device, a clutch, a treadle connected therewith, and means in connection with said clutch and said feed device whereby the operation of the former is prevented until said feed device has reached a certain predetermined position, substantially as described.

18. In a riveting-press, the combination, with a reciprocating plunger, of a chain feed device for automatically advancing rivets into the machine, a clutch, a treadle connected therewith, a pin having its end adapted to pass between the links of said feed-chain when a rivet is in proper position to be engaged by said plunger, and means in connection with said pin to prevent the operation of said clutch unless said feed device is in its proper position, substantially as described.

19. In a riveting-press, the combination, with a sliding rivet-feeding device, of a pin normally out of engagement with said feed device, a pivoted lever, a disk carried thereby, a clutch, a bar connected with said clutch and with a treadle, whereby said clutch may be thrown into operation to start the machine, a pawl carried by said bar and in engagement with said disk, and a pin also carried by said bar and fitting within a recess in said disk, whereby the operation of said clutch is prevented unless said feed device is in its proper position, substantially as described.

20. The combination, with a chain rivet-feeding device, of a pin 41 adapted to enter the space between the links of the chain, a lever 45 engaging said pin, a disk 46 carried by said lever, a clutch, a bar 54 having one end connected with said clutch and the other to a treadle, and means carried by said bar to engage said disk and prevent the operation of the clutch unless said feed device is in its proper position, substantially as described.

21. In a riveting-press, having a clutch to be thrown into operation by the movement of the treadle to start the machine, a locking device to prevent the operation of said clutch said device comprising a sliding pin, a pivoted lever, a disk carried by said lever, a recess 48 provided in said disk, a pin 51 fitting therein, a pawl 53 also in engagement with said disk and operated by the movement of the treadle to depress said lever and said pin and throw the clutch into operation to start the machine, substantially as described.

22. A locking mechanism for riveting-presses, comprising a bar 54 connected at one end to a clutch and at the other to a treadle, a pawl 53 and a pin 51 carried by said bar, a pivoted lever, a disk carried by said lever and having notches or recesses to be engaged by said pawl and said pin, a sliding pin 41, and means for normally holding the same in engagement with said pivoted lever, substantially as described.

23. In a riveting-press, the combination, with a reciprocating riveting mechanism, of a feed device for automatically advancing rivets into the machine, a horn, an anvil supported therein, a yielding guide-bar over which the rivets are moved by said feed device and said guide-bar having a hole or opening to receive said anvil, substantially as described.

24. In a riveting-press, the combination, with a reciprocating riveting mechanism, of a feed device for automatically advancing rivets into the machine, a horn, an anvil therein, a pivoted guide-bar over which the rivets are moved by said sliding feed, springs provided on said horn beneath said guide-bar, and an opening provided in said guide-bar to receive the end of said anvil, substantially as described.

25. In a reveting device, a head, spreading jaws mounted therein and movable independently of said head, means whereby said jaws may be held upon the material to be riveted with a yielding pressure, and a riveting hammer or punch operating between said jaws, substantially as described.

26. In a riveting device, a head, jaws mounted therein and movable independently of said head and of each other, a yielding backing for said jaws and an intermediate riveting hammer or punch, substantially as described.

27. In a riveting device, a head, sliding jaws mounted therein, means for holding said jaws upon the material to be riveted with a yielding pressure and permitting them to separate when the head is at or near the limit of its downward stroke, and a riveting hammer or punch operating between said jaws and adapted, when said jaws have separated, to engage the shank of a rivet and form a head thereon, substantially as described.

28. In a riveting-press, the combination, with a vertically-reciprocating plunger and the riveting mechanism supported thereon, of a chain feed device having a series of holes or sockets wherein rivets are placed, an anvil whereon the rivets are deposited by said feed device, and means carried by said plunger for locking said feed device during the riveting operation, substantially as described.

29. In a riveting device, a head, jaws mounted therein forming a female punch-die to bear upon the material to be riveted and draw the rivet-shank up through the same, a yielding backing for said jaws, a hammer or riveting-punch, and means for relieving the pressure upon said jaws, whereby when the head begins its upward movement said jaws will be loose in their sockets and permitted to free themselves from the rivet, substantially as described.

30. In a riveting-press, a reciprocating plunger, a head provided thereon, jaws mounted therein, a yielding backing for said jaws, whereby the same are held in engagement with the material to be riveted with a yielding pressure, a riveting hammer or punch to form a head upon the shank of the rivet, and means operated by the descent of said plunger for relieving the pressure upon said jaws and permitting them to move freely in their sockets and free themselves from the head of the rivet at the moment said plunger begins its upward stroke, substantially as described.

31. In a riveting-press, the combination, with a reciprocating riveting-head, of a series of movable jaws mounted therein, a riveting punch or hammer provided between said jaws in position to engage the shank of a rivet, means for holding said jaws in engagement with the material to be riveted with a yielding pressure, and means for loosening said jaws in their sockets to permit them to disengage themselves from the head of the rivet when the riveting-head begins its upward stroke, substantially as described.

32. In a riveting-press, a reciprocating plunger, a head carried thereby, sliding jaws mounted in said head, the lower ends of said jaws forming a female punch-die to bear upon the material to be riveted and draw the rivet-shank up through the same, a yielding backing for said jaws and a riveting hammer or punch operating between the same to form a head upon the shank of the rivet, substantially as described.

33. In a riveting-press, a reciprocating plunger, a head carried thereby, having a series of converging sockets, a series of jaws provided in said sockets, the lower ends of said jaws forming a female punch-die, a yielding backing for said jaws, and a riveting hammer or punch operating between the same to head the rivet, substantially as described.

34. In a riveting-press, a head, jaws mounted therein, a yielding backing therefor an intermediate hammer or riveting-punch, an anvil and a yielding guide block or bar having a socket to receive the end of said anvil, substantially as described.

35. In a riveting device, a head, a series of movable jaws therein, a yielding backing therefor, an intermediate hammer or riveting-punch adapted to engage the shank of a rivet, an anvil, and a yielding guide bar or block having a socket to receive said anvil, substantially as described.

36. In a riveting-press, a reciprocating plunger, a riveting-head carried thereby and provided with a series of sockets converging from top to bottom, a series of longitudinally and laterally movable jaws fitting within said sockets, the converging lower ends of said jaws forming a female punch-die, a yielding backing for said jaws and a riveting hammer or punch provided between the same, substantially as described.

37. The combination, with a reciprocating plunger, of a head having a shank secured to said plunger, a series of converging jaws fitting within a corresponding number of sockets within said head, a washer provided on said shank and normally resting upon said jaws, a lock-nut also provided on said shank, a spring device between said lock-nut and said washer, and a riveting hammer or punch provided between said jaws, for the purpose specified.

38. The combination, with a riveting-head having a series of converging sockets, of a series of pins fitting loosely therein and forming jaws whose lower ends act as a female punch-die to bear upon the material to be riveted, a yielding device carried by said head and forming a backing for said jaws, and a riveting hammer or punch provided between said jaws, substantially as described.

39. The combination, with a reciprocating riveting-head having a series of sockets, of a series of pins fitting loosely therein, the lower ends of said pins forming a female punch-die, a yielding backing for said jaws, a riveting hammer or punch operating between the same, and a cam device operated by the descent of said head for relieving the pressure upon said jaws to permit them to free themselves from the head of the rivet when said riveting-head begins its upward stroke, substantially as described.

40. The combination, with a reciprocating riveting-head having a series of converging sockets, of a series of longitudinally-slidable pins provided in said sockets, the lower ends of said pins forming a female punch-die to bear upon the material to be riveted, a riveting hammer or punch provided between said pins and a backing for said pins adapted to yield when pressure is applied to said head to permit said pins to move up in their sockets, and the riveting-hammer to engage the shank of the rivet, substantially as described.

41. A riveting device, comprising longitudinally-slidable jaws having converging lower ends forming a female punch-die, a yielding backing for said jaws, and a riveting hammer or punch operating between the same, substantially as described.

42. In a riveting mechanism, the combination, with a head, of a series of movable jaws mounted therein and having a space between them to receive the shank of a rivet, a yielding device in connection with said jaws, a riveting hammer or punch provided between said jaws and supported within said head, and a cam-lever whereby the pressure is relieved upon said jaws when the head begins its upward stroke, substantially as described.

43. In a machine of the class described, the combination, with the feed device, of means within the control of the operator for starting the machine, and means operating in connection with said starting means to prevent its operation until the feed device is in a certain predetermined position, substantially as described.

44. In a machine of the class described, a feed device, a riveting mechanism, a starting mechanism, operating means connected therewith and means preventing the movement of said operating means until the feed device has reached a certain predetermined position, substantially as described.

45. In a machine of the class described, a feed device, mechanism for starting said machine, a treadle connected with said mechanism, and a locking device connected with said treadle and operating in connection with said feed device to prevent the treadle from being depressed until said feed device has reached a certain predetermined position, substantially as described.

46. In a machine of the class described, a clutch, locking means engaging the same, a treadle, means in connection with said treadle to disengage said locking means from said clutch, a feed device and means in connection with said feed device and said treadle to prevent the operation of the treadle and the release of the machine until said feed device has reached a certain predetermined position.

47. In a machine of the class described, an automatic rivet-feeding means, a locking device, a mechanism for starting said machine, means within the control of the operator for operating said starting mechanism and said means being connected to said locking device whereby the operator is prevented from starting the machine until said feed device has reached a certain predetermined position.

48. In a machine of the class described, a sliding chain feed, a locking device, a starting mechanism for said machine, means within the control of the operator for operating said starting mechanism and said means being connected with said locking device whereby the operator is prevented from starting the machine until said feed device has reached a certain predetermined position, substantially as described.

49. In a riveting device, a plurality of jaws longitudinally movable independently of their support, in combination, with a riveting hammer or punch operating between them.

50. In a riveting device, a plurality of jaws slidable independently of their support, in combination, with a riveting hammer or punch operating between them.

51. In a riveting device, a plurality of sliding jaws, having converging lower ends and adapted to slide independently of their support, in combination, with a riveting hammer or punch operating between them.

52. The combination, with a riveting-head, of jaws loosely mounted therein and adapted to bear upon the material to be riveted with a yielding pressure, a riveting hammer or punch operating between said jaws and means for relieving the pressure upon said jaws to permit them to separate when said head begins its upstroke, substantially as described.

53. The combination, with a riveting-head, of jaws loosely mounted therein, and adapted to bear upon the material to be riveted with a yielding pressure, a riveting hammer or punch operating between said jaws, and means for automatically relieving the pressure upon said jaws to permit them to separate when said head begins its upstroke, substantially as described.

54. The combination, with a riveting-head, of jaws loosely mounted therein, and adapted to bear upon the material to be riveted with a yielding pressure, and a riveting hammer or punch operating between said jaws, substantially as described.

55. The combination, with a riveting-head, of jaws loosely mounted therein the lower ends of said jaws forming a female punch-die to draw the shank of the rivet up through the material to be riveted, and a riveting hammer or punch operating between said jaws, substantially as described.

56. In a press, a head or plunger, a feed device, a clutch within the control of the operator for starting the machine, and means preventing the movement of said clutch until the feed device has reached a certain predetermined position.

In testimony whereof I have hereunto set my hand this 23d day of June, 1899.

GEORGE W. WEBER.

Witnesses:
RICHARD PAUL,
M. C. NOONAN.